US006788244B1

(12) United States Patent
Tam (10) Patent No.: US 6,788,244 B1
(45) Date of Patent: Sep. 7, 2004

(54) INSPECTION DEVICE FOR RADAR ABSORBING MATERIALS

(75) Inventor: Kent K. Tam, Rowland Heights, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/617,464

(22) Filed: Jul. 11, 2003

(51) Int. Cl.$^7$ .......................... G01S 13/00; G01S 13/08; G01S 13/88
(52) U.S. Cl. ............... 342/22; 342/1; 342/118; 342/175; 342/195; 324/629; 324/637; 324/639; 324/642; 324/644; 73/865.8; 73/866
(58) Field of Search ............................... 342/123–145, 342/1–12, 21, 22, 27, 82, 89, 118, 165–175, 192–197; 73/865.8, 866, 432.1; 324/629, 637–646

(56) References Cited

U.S. PATENT DOCUMENTS

| 4,161,731 A | * | 7/1979 | Barr | 342/22 |
| 4,415,898 A | * | 11/1983 | Gaunaurd et al. | 342/192 |
| 5,012,248 A |   | 4/1991 | Monro et al. | 342/22 |
| 5,539,322 A | * | 7/1996 | Zoughi et al. | 324/644 |
| 5,574,379 A | * | 11/1996 | Darling, Jr. | 324/642 |

* cited by examiner

Primary Examiner—Bernarr E. Gregory
(74) Attorney, Agent, or Firm—Louis L. Dachs (57) ABSTRACT

The invention is a device for inspecting an assembly including a surface coating containing magnetic radar-absorbing materials on a conductive surface. In detail, the device includes a first system for transmitting an electromagnetic signal to the assembly, which includes a first waveguide made of a conductive material coupled in series to a second waveguide made of a dielectric material. A second system is provided for receiving the portion of the electromagnetic signal reflected from the assembly, which includes a third waveguide made of a conductive material coupled in series to a fourth waveguide made of a dielectric material. Thus the electromagnetic signal is transmitted from the first waveguide to the second waveguide on to the assembly and the portion of the electromagnetic signal reflected off the assembly is received by the fourth-waveguide and transmitted to the third, waveguide.

19 Claims, 7 Drawing Sheets

| DIMENSION | | X BAND (IN) | C BAND (IN) |
|---|---|---|---|
| LENGTH | 73 | 2.0 | 2.0 |
| HEIGH | 66 | 0.398 | 0.620 |
| WIDTH | 68 | 0.898 | 1.370 |
| LENGTH | 75 | 2.0 | 3.5 |
| EDGE | 78 | .030 | .030 |
| LENGTH | 81 | 4.0 | 5.0 |
| EDGE | 84 | .030 | .030 |

INSPECTION DEVICE FOR RADAR ABSORBING MATERIALS

BACKGROUND OF THE INVENTION

1. Field of the Invention

The invention relates to the field of inspection devices and, in particular, to a non-contacting inspection device to measure the thickness of radar absorbing materials (RAM) applied to a conducting surface.

2. Description of Related Art

A RAM coatings contains magnetic particles incorporated into a binder such as a urethane paint. The thickness of the coating must be controlled in order to obtain the proper radar absorption properties. One approach is to use a hand held thickness measuring device as disclosed in U.S. Pat. No. 5,012,248 "Radar Absorption Material Thickness Measuring Device" by J. R. Munroe, et al. This invention comprises a radiating element assembly for transmitting RF energy to and recovering reflected RF energy from the coating. A visual display is provided to indicate the thickness of the coating. A portable power supply is coupled to the detector assembly making it portable. This device is highly suitable for use in checking repairs made in the field. While this device works well, it requires contact with the surface.

It is desirable to automate the application of RAM coating by use of robotic spray machines. However, since coating thickness is critical, it is desirable to check the coating thickness prior to it curing. This would make the by J. R. Munroe, et al. device unusable because of the damage to the coating that would occur upon movement of the device across the wet surface. This problem can be avoided by the use of radiating and receiving horns angled toward each other. The signal from the radiating horn is directed at the surface and the return signal is picked up by the receiving horn. However, the horns must be positioned at 12 inches from the surface. Thus the measurement is limited to relatively large areas. This prevents accurate readings of significantly curved surfaces. Furthermore, it can not be used in confined areas such as the engine inlet ducts on aircraft.

Conventional inspection techniques such as those, which use ultrasonic techniques, are unsuitable, for radar absorption is not measured, because ultrasound does not propagate well in loaded urethane or silicon based materials. Thus it is possible that the thickness may be correct, but the area may not properly loaded with magnetic materials.

Thus, it is a primary object of the invention to provide a thickness and radar performance inspection device for inspecting RAM coatings.

It is another primary object of the invention to provide a non-contacting thickness inspection device for inspecting RAM coatings It is a further object of the invention to provide a thickness inspection device for inspecting RAM coatings that have been applied to curved surfaces.

It is a still further object of the invention to provide a thickness inspection device for inspecting RAM coatings that inspected surfaces located in confined areas.

SUMMARY OF THE INVENTION

The invention is device for inspecting an assembly that including a surface coating containing radar-absorbing materials on a conductive surface or substrate. In detail, the device includes a first circuit for transmitting an electromagnetic signal to the assembly. The first circuit includes a radio frequency (RF) source of electromagnetic radiation coupled to a waveguide made of a conductive material coupled in series to a second wave guide made of a dielectric material with their longitudinal axis aligned. A second circuit is provided for receiving the portion of the electromagnetic radiation transmitted by the first circuit reflected from the assembly. The second circuit includes a third waveguide made of a conductive material coupled in series to a fourth waveguide made of a dielectric material with their longitudinal axis aligned. The second circuit further includes a RF power detector coupled to the third waveguide. Thus an electromagnetic signal is transmitted from the first waveguide to the second waveguide on to the assembly and the portion of the electromagnetic signal reflected off the assembly is received by said fourth waveguide and transmitted to said third waveguide and to the RF power detector. The longitudinal axes of the first and second waveguides are at an acute angle to the longitudinal axis of the third and fourth waveguides. This angle is preferably 10 degrees.

The second and fourth waveguides are solid and made of a dielectric material such as a Polytetrafluoroethylene It is important to provide an impedance match between the first and second waveguides and the third and fourth waveguides, and the first and fourth waveguides to free space. This is accomplished by having the center portion of the second and fourth waveguides fit within the first and third waveguides. A portion of the second and third waveguides extend into the first and third waveguides are tapered along their top and bottom surfaces to a relatively shape edge at the end there of. A portion of the waveguides on the ends extending out of the first and third wave guides are tapered along their sides to a relatively shape edge.

The output from the RF power detector is fed to a programmable gain amplifier and thereafter to a signal digitizer. The programmable RF source and RF power detector, as well as the amplifier and signal digitizer are typically controlled by ar-microprocessor. The second and fourth waveguides maintain about 0.75 inch away from the surface of the assembly being inspected. Thus the device is typically mounted on a robotic arm, such that the assembly is automatically inspected, in a manner similar to the robotic spray machines used to apply the coating. Thus the inspection process is no different from other automated inspection systems. However, this device allows the coating to be inspected prior to its curing, .while still in a wet condition. Thus any issue associated with the material and the application process can be corrected prior to the coating curing.

The novel features which are believed to be characteristic of the invention, both as to its organization and method of operation, together with further objects and advantages thereof, will be better understood from the following description in connection with the accompanying drawings in which 1B the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
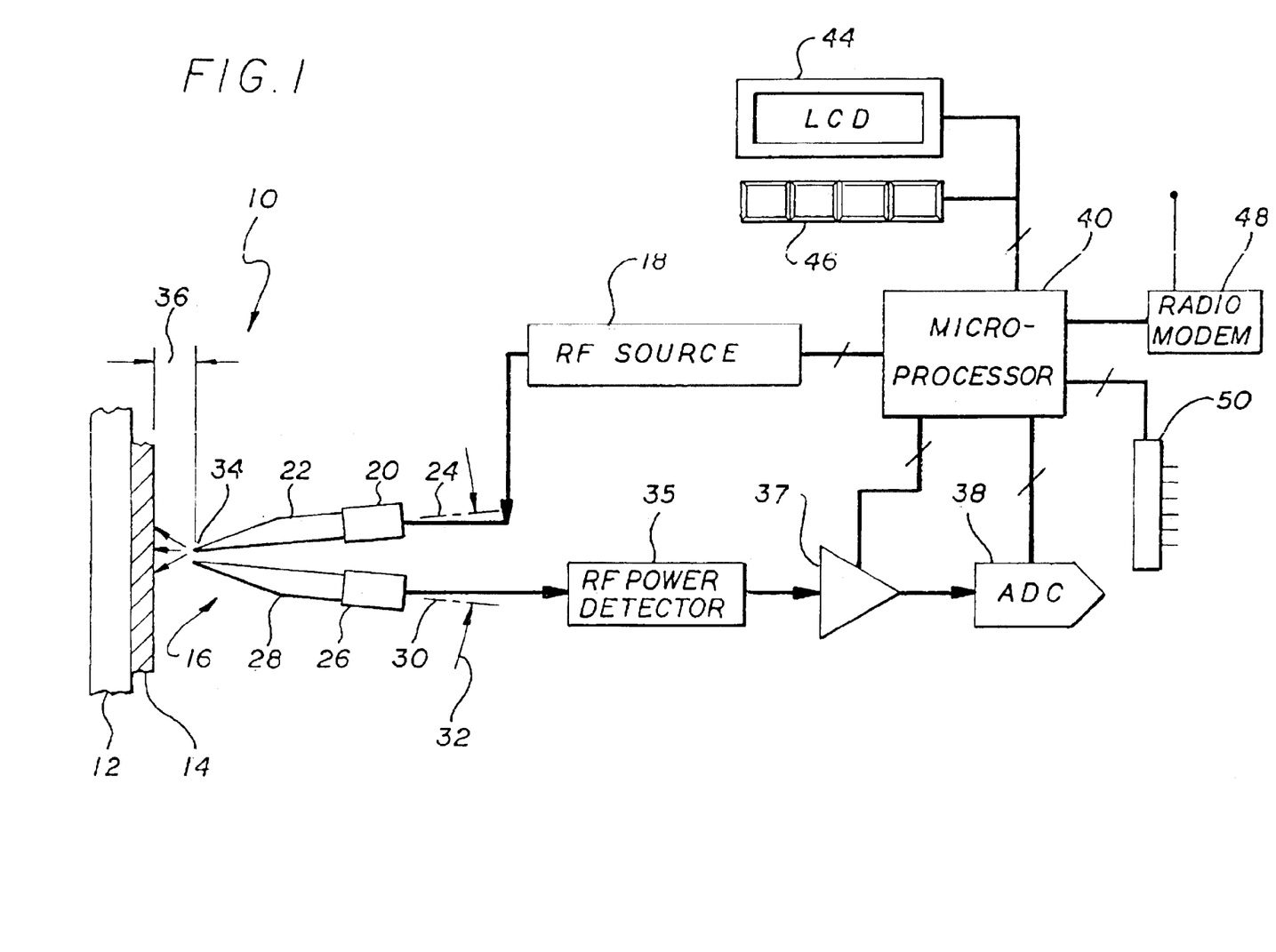
FIG. 1 is a block diagram of the subject device

Referring to FIG. 1, the structural assembly, indicated by numeral 10, comprises a conductive metal substrate 12 having a coating 14 loaded with magnetic particles (not shown). This coating 14 will absorb a portion of electromagnetic energy (radar beams) and reflect the remainder. The subject inspection device, generally indicated by numeral 16, includes a RF source of electromagnetic energy 18, which feeds a first conductive (metal) waveguide 20, which is connected in series with a solid waveguide 22 made of a dielectric material. A suitable RF generator 18 is a fixed frequency type produced by Lucix Technology, Camarillo, Calif. Variable or programmable RF generators can also be used. The first and second waveguides 20 and 22 have an aligned longitudinal axis 24. Preferably, the second-waveguide is made of. Polytetrafluoroethylene (PTFE), for-example TEFLON® manufactured by the E. I. duPont de Nemours & Company, Delaware.

The waveguide assembly 16 further includes a third waveguide 26, made of conductor (metal), which is connected in series with a fourth solid wave guide 28, also made of a dielectric material. The third and fourth waveguides 26 and 28 also have a common longitudinal axis 30. The longitudinal axis 24 of the first and second waveguides 20 and 22 is at an acute angle 32 to the longitudinal axis 30 of waveguides 26 and 28. This acute angle 32 is preferably 10 degrees.

Thus when electromagnetic radiation from the RF source 18 is provided to the waveguide 20 and is directed to the waveguide 22 where it exits at end 34 and strikes the assembly 10 the portion reflected back enters the waveguide 28 and travels to waveguide 26. The waveguide 26 is electrically connected to a RF power detector 35. A suitable power detector is obtainable from Krytar Corporation, Sunnyvale, Calif. For best results, the waveguides 22 and 28 should be at a distance 36 of 0.75 inch (which will be subsequently discussed). The detail design of these waveguides 20, 22 and 26 and 28 will be subsequently discussed.

Figure 2:
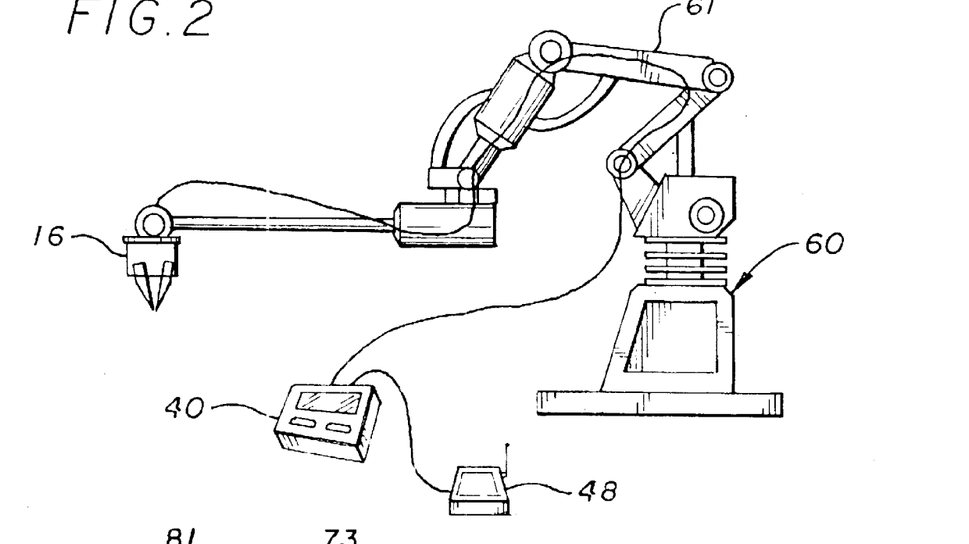
FIG. 2 is a side view of a robotic arm incorporating the subject device

The output from the RF power detector 35 is coupled to programmable gain amplifier 37, which, in turn, is coupled to an analog signal digitizer 38. The amplifier 37 and digitizer 38, as well as the RF source 18 are all connected to the microprocessor 40. A suitable microcontroller module with a built-in digitizer is obtainable from Micromint, Incorporated, Lake Mary, Fla. A LCD display 44 and keypad 46 are also coupled to the microprocessor 40. The microprocessor 40, in turn, is typically coupled to a radio modem 48 and/or other external interface 50. Thus, as illustrated in FIG. 2, the microprocessor 40 could interface with the robotic machine 60 with the device 16 attached to a robotic arm 61 for automated inspection. However, for purpose of defining the invention in its broadest sense, the first, second, third and fourth waveguides 22, 24, 26 and 28, and RF generator 18 and RF detector 35 are the main elements.

Figure 3:
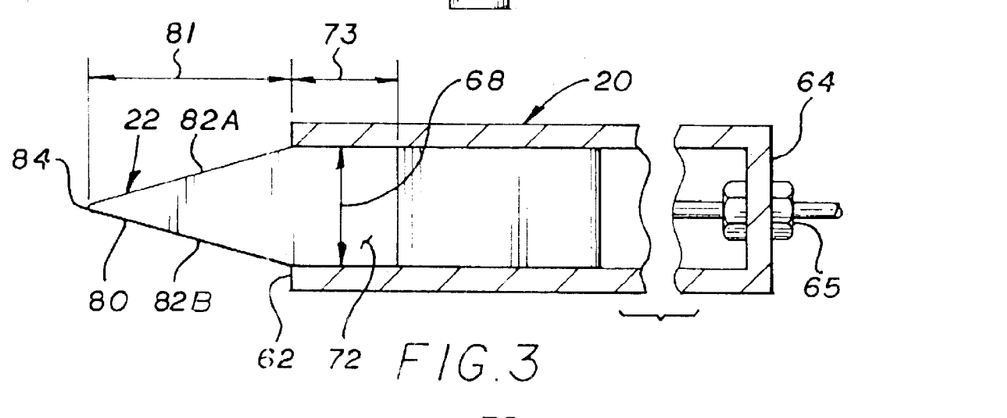
FIG. 3 is a top cross-sectional view of the first and second waveguide.
Figure 4:
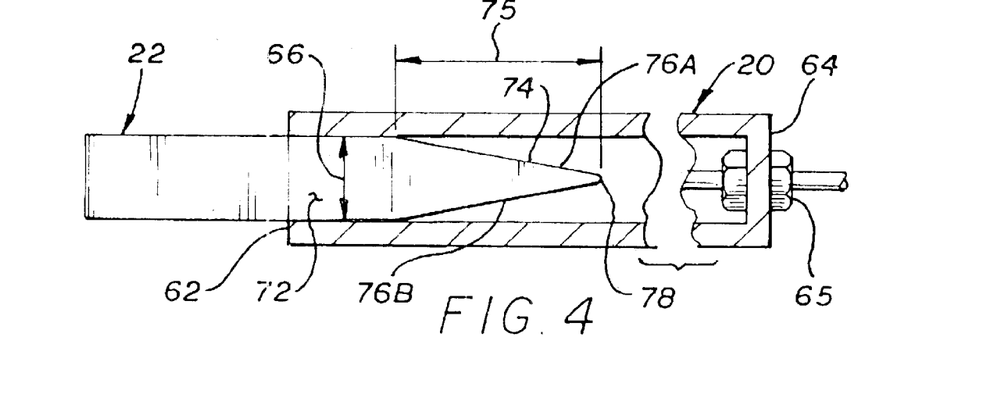
FIG. 4 is a side cross-sectional view of the first and second waveguides shown in FIG. 3.
Figure 5:
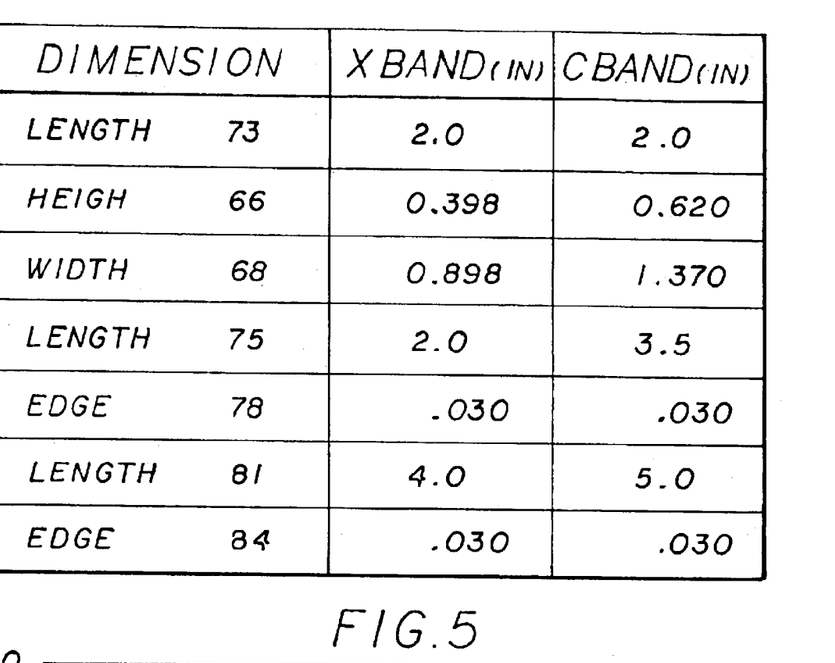
FIG. 5 is a chart providing the dimensions of the third waveguide for X and C band electromagnetic transmissions.

In FIGS. 3 and 4, top and side views of the waveguides 20 and 22 are presented and in FIG. 5 a table of the values of the dimensions are presented for both X and C band wave guides. The waveguide 20 is conventional and its length and critical dimensions can be easily calculated. Waveguide 20 has an, open first end 62 and a closed off second end 64, incorporating terminal 65 coupled to RF source 18. The waveguide 20 has an internal height 66 and an internal width 68 dictated by the frequency of the electromagnetic energy behind provided thereto. However, waveguide 22 (and 28) are shaped to provide impedance matching. Waveguide 22 includes a central portion 72 having a length 73, and an external height and width equal to the internal height 66 and internal width 68, respectively, of the waveguide 20. The waveguide 22 further has an end portion 74 further extending into the waveguide 20 having a length 75 and top and bottom surfaces 76A and 76B tapering to an edge 78. The wave guide 22 further includes a second end portion 80 having a length 81 and left and right sides 82A and 82B tapering to an edge 84. Again the dimensions of the waveguide for both K and C band are provided in FIG. 5. The dielectric waveguide serve two purposes: 1) funnel the electromagnetic radiation signals to close proximity to the structure 10 to be tested; and 2) create a matching impedance transition for the metal waveguides 20 and 26 to free space to maximize the signal transmission and reception efficiency.

Figure 6:
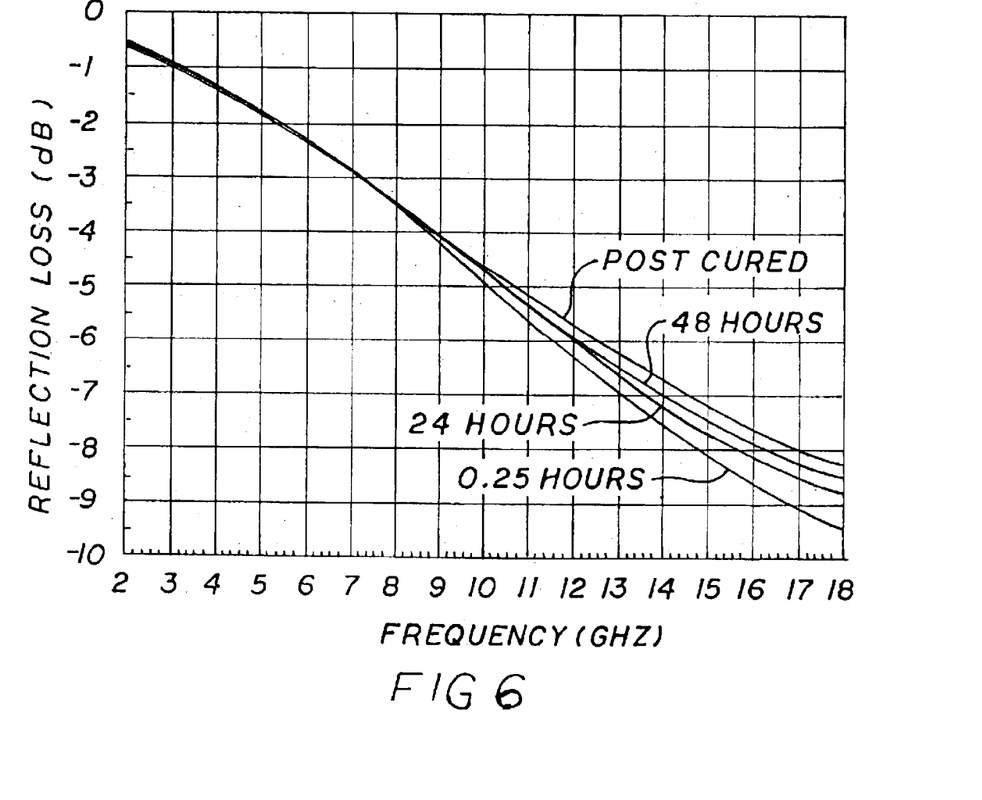
FIG. 6 is a graph of typical reflection loss verses frequency for varies cure times for a typical RAM coating.
Figure 7:
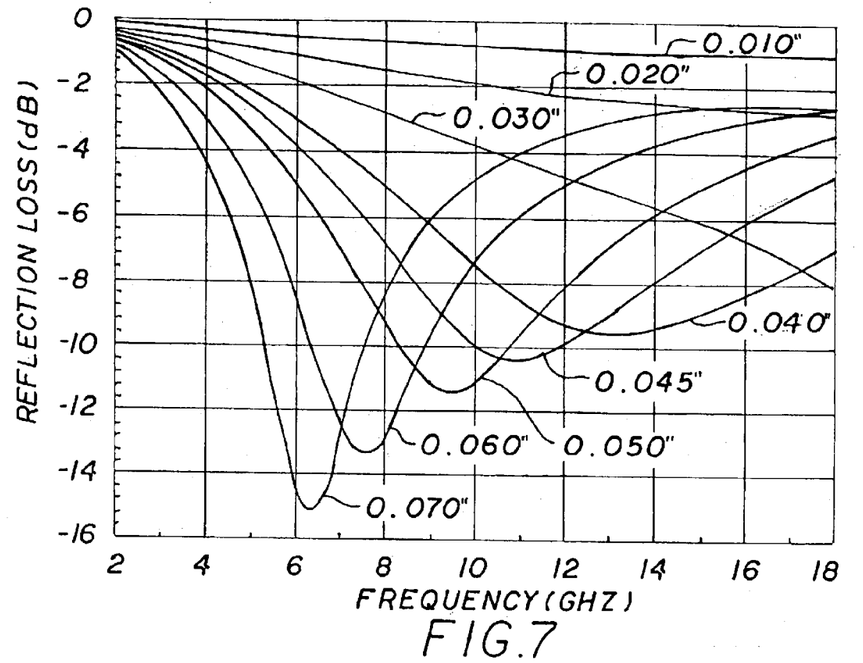
FIG. 7 is graph of reflection loss as a function of frequency for various RAM coating thickness for the material plotted in FIG. 6.

Tests were conducted to determine the proper test frequency. This was important because one of the main applications is to test the coating prior to curing. A typical reflection loss verses frequency for various cure times for a typical RAM coating is provided in FIG. 6. Note that the reflection loss below 9 GHz is about equal regardless of the cure time. Thus using a frequency below 9 GHz would yield a reflection loss that would be independent of the degree of cure. However, when one looks at the reflection loss as a function of frequency for various coating thickness as illustrated in FIG. 7, the issue becomes more complex. The dB reflection loss initially increases with frequency, but then starts to decrease as frequency increase. This indicates that if a single inspection frequency were used the inspection range of the coating thickness should be limited accordingly to avoid ambiguity.

Figure 8:
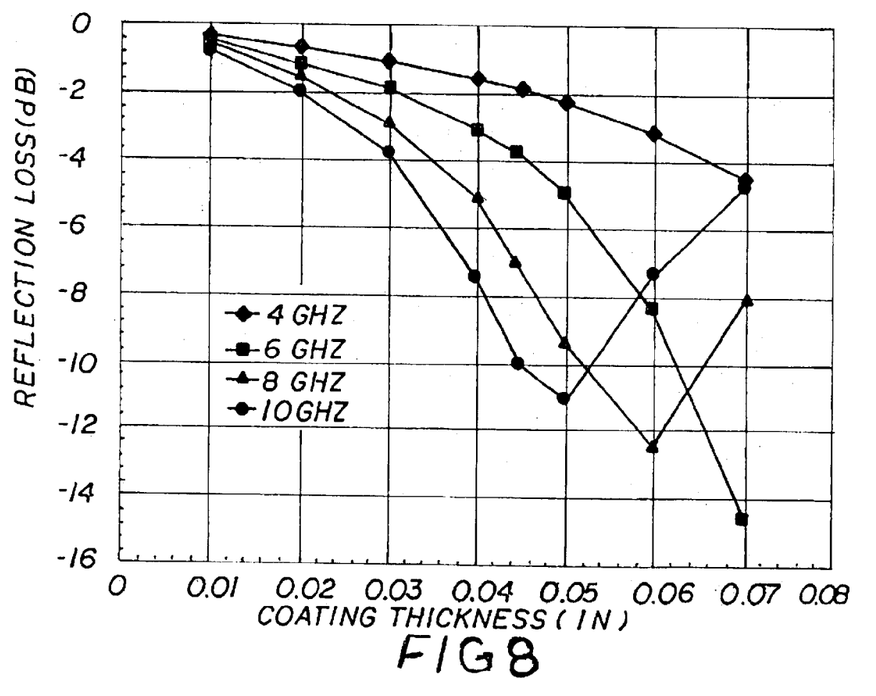
FIG. 8 is a graph of the detection sensitivity verses detection sensitivity for a 0.030-inch coating thickness for the typical RAM coating.

Plotting coating thickness verses reflection for varies frequencies, as illustrated in FIG. 8, provides a better insight into the problem. Note that the 4 and sis 6 GHz graphs show that the reflection loss magnitude increases with coating thickness monotonically. At 10 GHz, the reflection loss magnitude increases with coating thickness up to about 0.050-inch. Further increase in coating thickness results in a decrease of reflection loss magnitude. Thus for a 10 GHz single test frequency system, a thickness range of 0 to 0.45-inch may be achieved by simple data processing schemes. In order to measure RAM coating thickness using reflection loss at a single frequency without ambiguity, the test frequency must be lower than the center frequency at the high end of the thickness range.

Given a desired thickness measurement range, the data in FIG. 7 gives some insight to the resulting system's sensitivity. For example, a thickness measurement, range of 0 to 0.045-inch is required, All four frequencies in the graph have a monotonic reflection loss with the coating thickness. Using a 4 GHz test frequency, the measurement system would have a full scale reflection loss of 1.8 dB for the thickness range. While a 10 GHz system would have a reflection loss of 10 dB for the same thickness range. Computing the slope for each trace in FIG. 7 yields the detection sensitivity of each test frequency. The table in FIG. 8 summarizes the detection sensitivity for a coating of 0.30-inch.

The detection sensitivity is given in dB/(0.001-inch). This value signifies the amount of signal change in dB for each 0.001-inch change in the coating thickness. For example, increasing the coating thickness from 0.030-inch to 0.031-inch, the 4 and 10 GHz reflection loss would increase by 0.44 dB and 0.278 dB, respectively. If the device has a reading resolution of 0.1 dB, it would not be able to detect be able the thickness at 4 GHz. Small detection sensitivity values indicate the system would be insensitive to a small thickness change or would have less thickness detection resolution. The above suggests that 10 GHz would yield the best measurement sensitivity among the four tests frequencies for the selected RAM coating. However the graph in FIG. 6 shows that the 10 GHz reflection loss is sensitive to cure status. Thus if the frequency were reduced to 8 GHz, it would reduce this sensitivity to cure condition without a significant loss in detection sensitivity.

Figure 9:
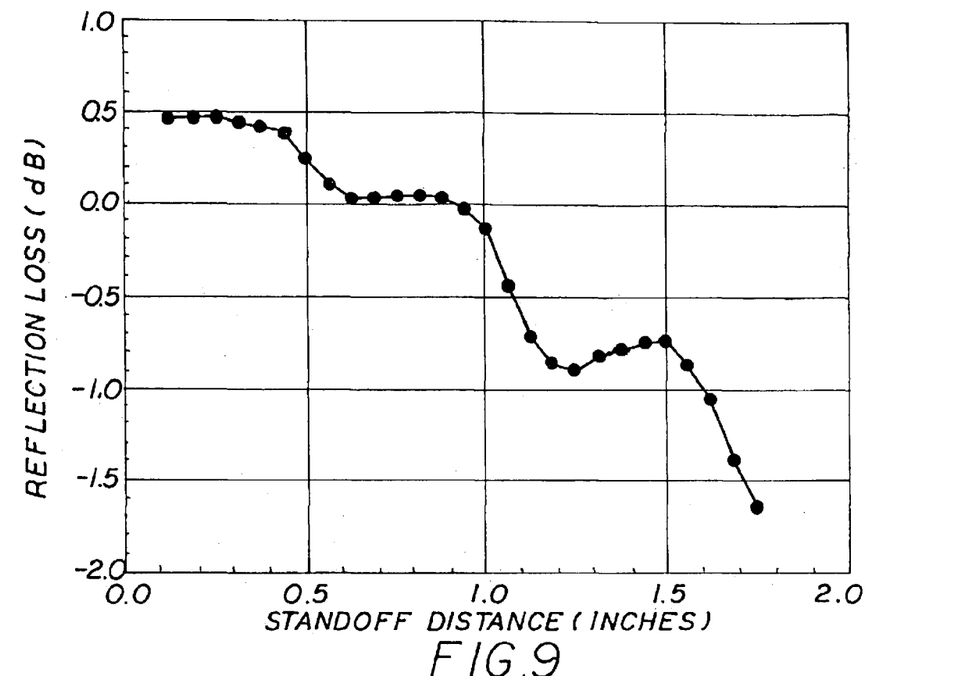
FIG. 9 is a graph of the standoff distance of the device verses reflection loss.

Tests were conducted to determine standoff sensitivity. An Aluminum plate was irradiated at 90 degrees incident angle at 0.125-inch increments. FIG. 9 is a graph of the standoff-distance verses reflection loss. The graph shows three distinct steps prior to a large drop off at 1.5 inches. The 0.125 to 0.5 inch range was considered to provide too small of a buffer from the test surface. Thus the second step between 0.6 to 0.9 inch was selected with the previously mentioned 0.75 inch being the middle point.

Figure 10:
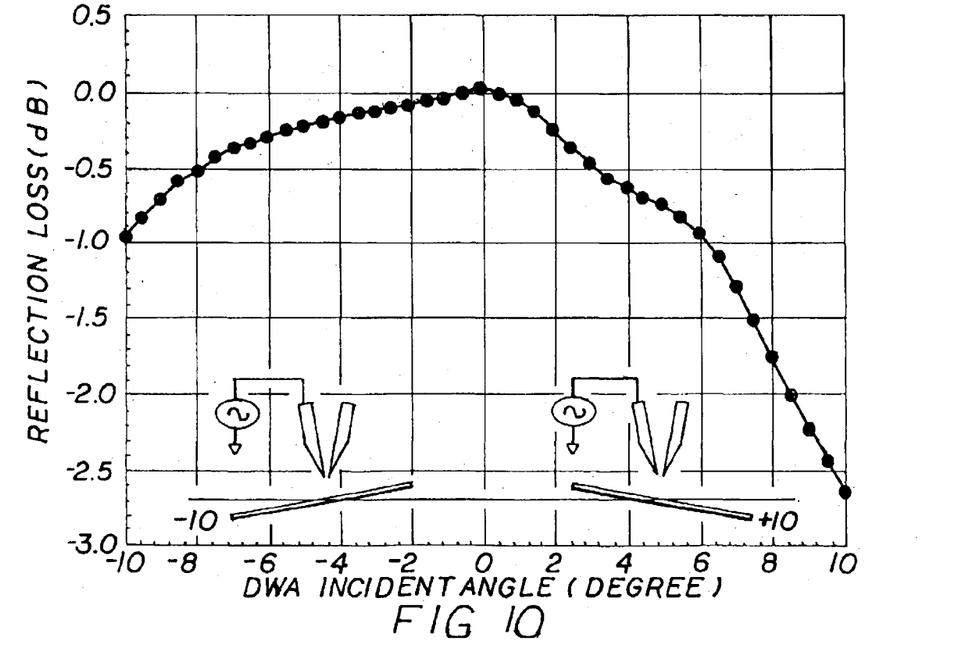
FIG. 10 is a graph of the device incident angle verses reflection loss.

FIG. 10 represents a plot of device incident angle verses reflection loss using the Aluminum plate as a target. When the plate surface was rotated towards alignment (counter clockwise) with the transmitting waveguide the reflection loss was mild. However, when rotated in the clockwise direction, drop off was more pronounced. But despite this biased response, it can be seen that the device can tolerate a four-degree incident angle change and still keep the reading discrepancy within 0.1 dB.

Figure 11:
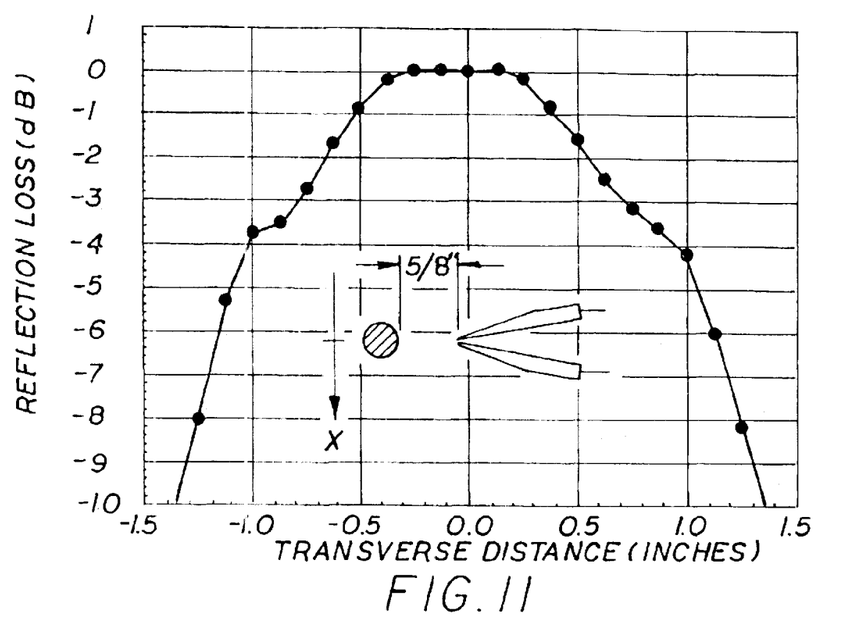
FIG. 11 is a graph of the beam pattern.

Tests were run to determine the beam pattern. Referring the FIG. 11, a 0.125-inch diameter, 12 inch long brass rod was moved plus and minus 1.5 inches in 0.125 step increments in a direction perpendicular to the device (X direction) and passed by the device at a distance of 0.625-inch. The plot of transverse distance verses reflection loss indicates that a practically flat response is obtained within a transverse distance of approximately 0.4-inch The minus three dB beamwidth of the device is approximately 1.5 inch.

Figure 12:
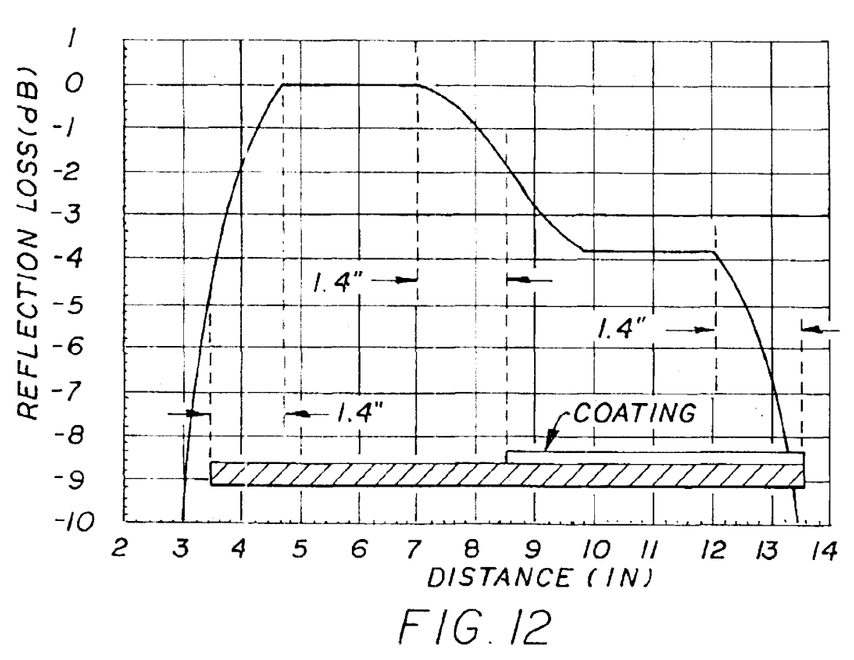
FIG. 12 is a graph of the predicted reflection loss of a plate with 50 percent of the surface covered with the RAM coating

The sensitivity to nearby features was also examined numerically by convolving the beamwidth of the device and the reflectivity of different coated surfaces. As shown in FIG. 12 a conductive plate was coated over one half of its surface with a RAM coating designed to provide a 3.7 dB attenuation at 10 GHz. As the device moves to the right, the expected 0 dB reading from the bare surface is reached at approximately 1.4 inches from the edge. As the device approaches the coating the dB reading starts to approach the expected 3.7 dB attenuation. As the coated edge is approached, the attenuation rapidly increases.

Figure 13:
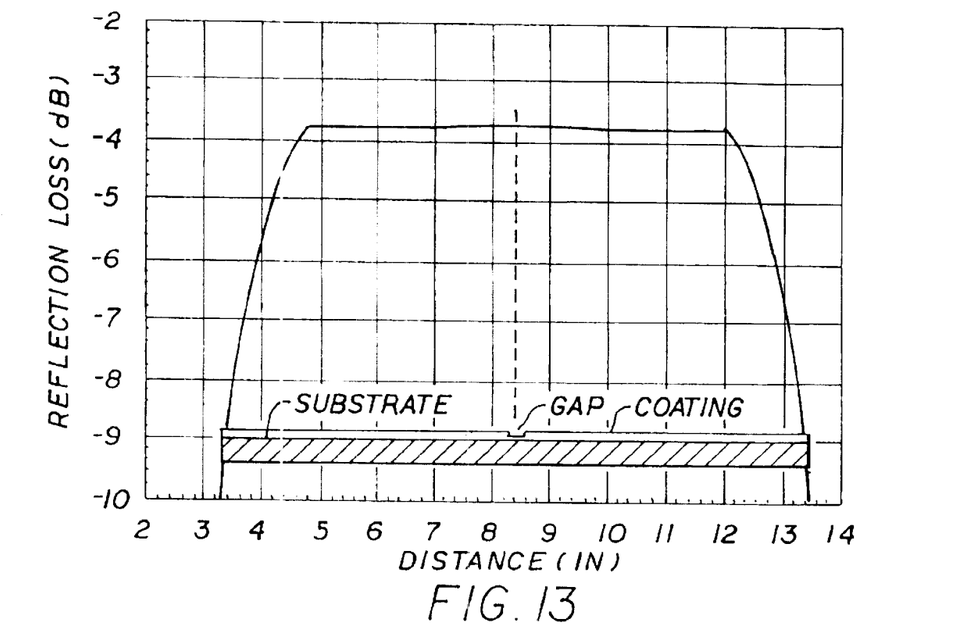
FIG. 13 is a graph of the predicted reflection loss of metal plate fully covered with the typical RAM coating having a portion with a reduced thickness
Figure 14:
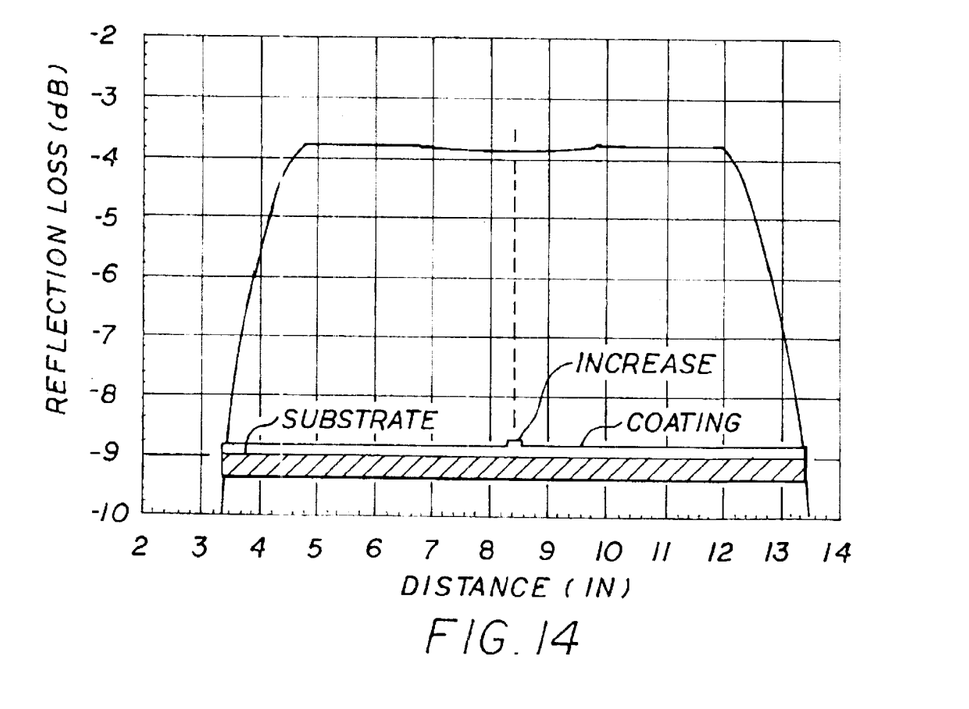
FIG. 14 is a graph of the predicted reflection loss of metal plate fully covered with the typical RAM coating having a portion with an increased thickness.

FIG. 13 illustrates the effect of a localized decrease in coating thickness of a RAM coating. The coating provides an attenuation of 3.78 dB on an aluminum substrate. The thin-area of the coating was 0.030-inch thick and 0.125-inch wide and 0.005 inch deep. The attenuation only decreased by 0.06 dB to 3.72 dB and the original reflection loss was restored at about 1.4 inches from-the recess. FIG. 14, on the other hand illustrates-the effect of a slight increase in coating thickness (a 0.125-inch wide 0.005-inch increase in thickness). The effect was a 0.1 dB increase in attenuation to 3.88 dB. At about 1.4 inches away from the increase, the original reflection loss was restored.

Thus it can be seen that the device can provide non-contacting measurement of RAM coatings of various thickness and degree of cure. It can accommodate surface irregularities and is readily adaptable to robotic inspection systems. It can also be adapted to various types of RAM coating types.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

Industrial Applicability

The invention has applicability to inspection equipment industry.

What is claimed is:

1. A device for inspecting an assembly including a surface coating containing magnetic radar absorbing materials on a conductive surface, the device comprising:

first and second hollow conductive waveguides having open first ends and closed off second ends, said first waveguide adapted to direct electromagnetic radiation to the surface of the coating and said second waveguide adapted to receive electromagnetic radiation reflected off the surface coating; said first and second waveguides at an acute angle to each other;

third and forth waveguides made of a dielectric material, said third and fourth wave guides having first ends extending into said first ends of said first and second wave guides and second ends extending outward from said first ends of said first and second wave guides;

first means coupled to said second end of said first waveguide for delivering electromagnetic energy to said first wave guide and to said third waveguide for transmission to the assembly; and second means coupled to said second end of said second waveguide for receiving electromagnetic energy transmitted by said first means to the assembly and reflected back to said fourth waveguide.

2. The device as set forth in claim 1 comprising:

said third and fourth wave guides having top and bottom surfaces and first and second side surfaces, a portion of said firsts end of said third and fourth wave guides tapered along the top and bottom surfaces to and edge, and a portion of said second ends of said third and fourth wave guides tapered along there first and second side surfaces to and edge.

3. The device as set forth in claim 2 comprising said third and fourth waveguides are made of solid pieces of dielectric material.

4. The device as set forth in claim 3 comprising said acute angle is generally ten degrees.

5. The device as set forth in claim 4 comprising said third and fourth waveguides are made of Polytetrafluoroethylene.

6. A device for inspecting an assembly including a surface coating containing magnetic radar absorbing materials on a conductive surface, the device comprising:

a first means for transmitting an electromagnetic signal to the assembly, said first means comprising:
a electromagnetic signal generating means; and
a first waveguide made of metal having first and second ends, said first waveguide for receiving the electromagnetic signal at said first end and transmitting the electromagnetic signal toward said second end;
a first waveguide made of a dielectric material, said second waveguide having a first end extending into said second end of said first waveguide and a second end extending outward from said second end of said first wave guide; and a second means for receiving the electromagnetic signal reflected back from the assembly, said second means comprising:
a electromagnetic signal receiving means; and
a third waveguide made of metal having first and second ends, said third wave guide for receiving the electromagnetic signal at said second end transmitting the electromagnetic signal toward said first end; and
a fourth waveguide made of a dielectric material, said fourth waveguide having a first end extending into said second end of said third waveguide and a second end extending outward from said second end of said first wave guide for receiving electromagnetic radiation reflected from the assembly.

7. The device as set forth in claim 6 comprising:

said second and fourth waveguides having top and bottom surfaces and first and second side surfaces, a portion of said firsts end of said third and fourth wave guides tapered along the top and bottom surfaces to and edge, and a portion of said second ends of said third and fourth wave guides tapered along there first and second side surfaces to and edge.

8. The device as set forth in claim 7 comprising said second and fourth waveguides are made of solid pieces of dielectric material.

9. The device as set forth in claim 8 comprising;

said first and second waveguide having longitudinal axis, said longitudinal axis of said first and second wave guides aligned with each other; and
said third and fourth waveguides having longitudinal axis, said longitudinal axis of said third and fourth wave guides aligned with each other.

10. The device as set forth in claim 9 wherein said longitudinal axis of said first and second waveguides are at an acute angle to said longitudinal axis of said third and fourth waveguides.

11. The device as set forth in claim 10 wherein said acute angle is ten degrees.

12. The device as set forth in claim 11 comprising said third and fourth waveguides are made of Polytetrafluoroethylene.

13. A device for inspecting an assembly including a surface coating containing magnetic radar absorbing materials on a conductive surface, the device comprising:

a first means for transmitting an electromagnetic signal to the assembly, said first means including a first waveguide made of a conductive material coupled in series to a second waveguide made of a dielectric material; and a second means for receiving the portion of the electromagnetic signal reflected from the assembly, said second means including a third waveguide made of a conductive material coupled in series to a fourth waveguide made of a dielectric material;

such that electromagnetic signal is transmitted from said first waveguide to said second waveguide on to the assembly and the portion of the electromagnetic signal reflected off the assembly is received by said fourth waveguide and transmitted to said third waveguide.

14. The device as set forth in claim 13 comprising:

said second and fourth waveguides having top and bottom surfaces and first and second side surfaces, a portion of said firsts end of said third and fourth waveguides tapered along the top and bottom surfaces to and edge, and a portion of said second ends of said third and fourth waveguides tapered along there first and second side surfaces to and edge.

15. The device as set forth in claim 14 comprising said second and fourth waveguides are made of solid pieces of dielectric material.

16. The device as set forth in claim 15 comprising;

said first and second waveguide having longitudinal axis, said longitudinal axis of said first and second waveguides aligned with each other; and
said third and fourth waveguides having longitudinal axis, said longitudinal axis of said third and fourth wave guides aligned with each other.

17. The device as set forth in claim 16 wherein said longitudinal axis of said first and second waves guides are at an acute angle to said longitudinal axis of said third and fourth waveguides.

18. The device as set forth in claim 17 wherein said acute angle is ten degrees.

19. The device as set forth in claim 18 comprising said third and fourth waveguides are made of Polytetrafluoroethylene.

* * * * *